Patented May 29, 1951

2,554,996

UNITED STATES PATENT OFFICE 2,554,996

22-MONOARYL-BISNOR-4,20:22-CHOLADIENE-3-ONES

Robert H. Levin, A. Vern McIntosh, Jr., and George B. Spero, Kalamazoo, Mich., assignors to The Upjohn Company, Kalamazoo, Mich., a corporation of Michigan No Drawing. Application April 25, 1949,
Serial No. 89,567

4 Claims. (Cl. 260—397.3)

This invention relates to 22-aryl-bisnor-4,20:22-choladiene-3-ones, compounds useful in the synthesis of progesterone.

The compounds of the present invention have the following formula:

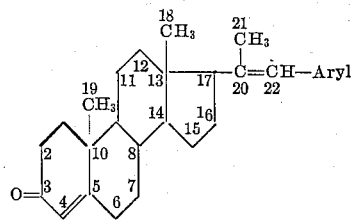

The aryl group in the above formula may be any convenient aryl group. However, practical considerations concerning the preparation of the 22-aryl compounds used in this invention, limit the aryl groups to those groups whose halogen substitution derivatives react in a satisfactory manner with magnesium to form an aryl magnesium halide compound. Representative aryl groups are, for example, phenyl, tolyl, alpha-naphthyl, beta-naphthyl, alkoxy-phenyl, alkoxy-naphthyl, alkyl-naphthyl, chlorophenyl, et cetera.

The novel compounds of the present invention may be conveniently prepared from 22-aryl-bisnor-4-cholene-22-ol-3-ones, described and claimed in our cofiled application Serial 89,566, by dehydration according to the method described and claimed in a prior-filed application, Serial 63,615, filed December 4, 1948. These compounds are white crystalline solids, soluble in hot alcohol and insoluble in cold alcohol.

The following procedure is given to illustrate one method which can be used to prepare the compounds of the present invention, but the said procedure is not to be construed as limiting.

PREPARATION 1.—PREPARATION OF 22-BENZOYLOXY-22-PHENYL-BISNOR-5-CHOLENE-3-OL

A solution of 701.6 milligrams of 3,22-dibenzoyloxy-22-phenyl-bisnor-5-cholene [Heyl, Centolella and Herr, J. Am. Chem. Soc. 69, 1960 (1947)] in 420 milliliters of acetone was mixed with 56 milliliters of 0.10-normal aqueous potassium hydroxide and allowed to stand forty-five hours at 33–34 degrees centigrade. The solution was then acidified by the addition of two milliliters of acetic acid and evaporated in vacuo until precipitation began. One volume of water was added and the mixture was cooled. There was thus obtained 597 milligrams of a solid melting at 114–125 degrees centigrade. The solid was dissolved in 25 milliliters of hot benzene, and allowed to stand at room temperature, thereby precipitating 46.6 milligrams of 22-phenyl-bisnor-5-cholene-3,22-diol melting at 222–227 degrees centigrade. The filtrate was passed through a column containing 50.5 grams of Fisher alumina. A first fraction of 71 milligrams was eluted with benzene and consisted of unchanged 3,22-dibenzoyloxy-22-phenyl-bisnor-5-cholene. The second fraction, 495 milligrams, was eluted with benzene containing two percent methanol, dissolved in 25 milliliters of warm benzene and placed in the refrigerator at 6 to 8 degrees centigrade to yield a precipitate of 16.0 milligrams of 22-phenyl-bisnor-5-cholene-3,22-diol having a melting point of 221–224 degrees centigrade. The filtrate was evaporated in vacuo, on a steam cone to yield 479 milligrams of crude 22-benzoyloxy-22-phenyl-5-cholene-3-ol as a light yellow foam.

PREPARATION 2.—22-BENZOYLOXY-22-PHENYL-BISNOR-4-CHOLENE-3-ONE

A solution of 479 milligrams of crude 22-benzoyloxy-22-phenyl-bisnor-5-cholene-3-ol in 20 milliliters of toluene and ten milliliters of cyclohexanone was distilled until one milliliter of distillate had been collected. Five-tenths gram of aluminum isopropoxide was then added and the mixture heated under reflux for three hours. The reaction mixture was shaken with ether and 3-normal hydrochloric acid, and the ether solution was washed with 3-normal hydrochloric acid, water, ten percent aqueous sodium hydroxide, 3-normal hydrochloric acid, and saturated aqueous sodium chloride. The solution was distilled with steam for an hour, giving 421 milligrams of a precipitate melting at 85–90 degrees centigrade. The precipitate was chromatographed over Fisher alumina, giving a main fraction of 419 milligrams which, when crystallized from ethanol and water yielded 332.3 milligrams of crystals, crude 22-benzoyloxy-22-phenyl-bisnor-4-cholene-3-one, melting at 158–164 degrees centigrade. After several crystallizations from alcohol-water, and two crystallizations from ethanol, the compound melted at 181.5–182.5 degrees centigrade; $[\alpha]_D^{25}$ —11.6 degrees.

Analysis:

| | C, | H, |
|---|---|---|
| Calculated for $C_{35}H_{42}O_3$: | 82.31 | 8.29 |
| Found: | 82.18 | 8.13 |

PREPARATION 3.—3-KETO-22-PHENYL-BISNOR-4-CHOLENE-22-OL

A solution of 79.3 milligrams (0.00016 mole) of 22-benzoyloxy-22-phenyl-bisnor-4-cholene-3-one in ten milliliters of benzene was mixed with a solution of 1.0 gram of 85 percent potassium hydroxide in 15 milliliters of methanol and heated under reflux for two and one-half hours. The resulting solution was diluted with water and extracted with ether. The ether solution was washed with water, dilute hydrochloric acid and aqueous sodium chloride, dried over anhydrous sodium sulfate, and evaporated in vacuo to yield a crystalline residue. This residue was recrystallized from a mixture of 18 milliliters of methanol and five milliliters of water to yield 46.8 milligrams of crystals melting at 218–221 degrees centigrade. Recrystallization from methanol and water gave 39.7 milligrams of crystals having a melting point of 230–232 degrees centigrade. $[\alpha]_D^{25}+174.2$ degrees.

PREPARATION 4.—3,22-DIHYDROXY-22-(PARA-CHLOROPHENYL)-BISNOR-5-CHOLENE

A solution of para-chlorophenylmagnesium bromide was prepared from 0.3 gram of magnesium, 3.3 grams of para-bromochlorobenzene and 50 milliliters of anhydrous ether in the usual manner. After the Grignard reagent had been obtained, an additional 75 milliliters of ether was added, the solution heated under reflux and a mixture of 1.0 gram of 3-acetoxy-bisnor-5-cholenaldehyde [J. Am. Chem. Soc. 69, 1960 (1947)] in 35 milliliters of benzene added dropwise over a period of 15 minutes. The reaction mixture was heated under reflux for an additional one hour, and poured into 100 milliliters of 10 percent hydrochloric acid and ice. The ether and benzene layer was separated and steam distilled. The solid remaining after the steam distillation was collected and crystallized from acetone, yielding a mixture of epimeric 3,22-dihydroxy-(parachlorophenyl)-bisnor-5-cholenes melting at 205–220 degrees centigrade.

In a like manner, para-anisylmagnesium bromide and 3-acetoxy-bisnor-5-cholenaldehyde were reacted to yield 3,22-dihydroxy-22-(paraanisyl)-bisnor-5-cholene, melting at 144–146 degrees centigrade.

PREPARATION 5

In a manner similar to that described in Preparation 2, 3,22-dihydroxy-22-(para-cholorophenyl)-bisnor-5-cholene is converted to 3-keto-22-hydroxy-22-(para-chorophenyl)-bisnor-4-cholene, melting at 260.5–262.5 degrees centigrade, and 3,22-dihydroxy-22-(para-anisyl)-bisnor-5-cholene is converted to 3-keto-22-hydroxy-(para-anisyl)-bisnor-4-cholene, melting at 178–184 degrees centigrade.

Example 1.—Preparation of 22-phenyl-bisnor-4,20:22-choladiene-3-one

A mixture of 0.48 gram of 22-phenyl-bisnor-4-cholene-22-ol-3-one, 2.0 grams of anhydrous oxalic acid and 20 milliliters of a mixture of diphenyl oxide and biphenyl (Dowtherm A) were heated under reflux for two hours. The reaction mixture was cooled to room temperature, dissolved in ether, the ether solution washed well with water and distilled with steam. The nonvolatile residue was extracted with ether, the ether solution dried and the ether removed. The oil residue was dissolved in 20 milliliters of commercial hexane and passed over 23 grams of alumina (Fisher adsorption alumina) in a column one centimeter in diameter. Elution with 70 milliliters of a mixture of equal parts of hexane and benzene removed the remainder of the Dowtherm A. Elution with 80 milliliters of a mixture of benzene (92 parts) and methanol (8 parts), evaporation of the solvent from the eluate, and crystallization from dilute methanol, yielded 84 milligrams of crude 22-phenyl-bisnor-4,20:22-choladiene-3-one, melting at 144–162 degrees centigrade.

After crystallization from methanol, a compound was obtained which melted at 168–172 degrees centigrade, $[\alpha]_D^{25}+76.7$ degrees.

Analysis:
Calculated for $C_{26}H_{36}O$: C, 86.54 H, 9.34
Found: 86.52 9.26

Example 2

When dehydrated in a manner similar to that of Example 1, 3-keto-22-hydroxy-22-(para-chlorophenyl)-bisnor-4-cholene yielded 22-(para-chlorophenyl)-bisnor-4,20:22-choladiene-3-one, melting at 227–230 degrees centigrade.

Likewise, when dehydrated in the above manner, 3-keto-22-hydroxy-22-(para-anisyl)-bisnor-4-cholene gave 22-(para-anisyl)-bisnor-4,20:22-choladiene-3-one, melting at 170–180 degrees centigrade.

Example 3

A solution of 0.5 gram of 22-hydroxy-22-phenyl-bisnor-4-cholene-3-one and 20 milligrams of phenol in 200 milliliters of toluene was heated under reflux for 20 minutes, 60 milligrams of concentrated sulfuric acid then added and the solution heated under reflux for an additional two hours. The solution was cooled, washed with aqueous five percent sodium hydroxide solution and washed with water until a pH of about 7 was obtained, and evaporated to dryness under a reduced pressure of about 5 millimeters of mercury absolute. After several crystallizations from methanol, 22-phenyl-bisnor-4,20:22-choladiene, melting at 168–172 degrees centigrade was obtained.

Similarly the 22-tolyl, 22-(beta-naphthyl), 22-(alkyl-phenyl), 22-(alkoxy-naphthyl), et cetera, substituted compounds of this invention may be prepared.

The compounds thus obtained may be converted to progesterone by the mild oxidation of the 20:22-double bond using ozone, chromic oxide, or other mild oxidizing agents, in a manner known to the art.

It is to be understood that the invention is not limited to the exact details or compounds shown and described, as obvious modifications and substitutions of equivalents may be made in the present invention without departing from the spirit or scope thereof, which will be apparent to one skilled in the art, and we therefore limit ourselves only as defined in the appended claims.

We claim:

1. A 22-mono-aryl-bisnor-4,20:22-choladiene-3-one wherein the aryl radical is selected from the group consisting of phenyl, chlorophenyl, and alkoxy-phenyl.

2. 22-phenyl-bisnor-4,20:22-choladiene-3-one.

3. 22-(para-chlorophenyl)-bisnor-4,20:22-choladiene-3-one.

4. 22-(para-anisyl)-bisnor-4,20:22-choladiene-3-one.

ROBERT H. LEVIN.
A. VERN McINTOSH, JR.
GEORGE B. SPERO.

REFERENCES CITED

The following references are of record in the file of this patent:

UNITED STATES PATENTS

| Number | Name | Date |
| --- | --- | --- |
| 2,394,551 | Julian et al. | Feb. 12, 1946 |